US009810370B2

(12) United States Patent
Elliott et al.

(10) Patent No.: US 9,810,370 B2
(45) Date of Patent: Nov. 7, 2017

(54) DESK MOUNT FOR COMPUTER DISPLAY(S)

(71) Applicant: HealthPostures, LLC, Burnsville, MN (US)

(72) Inventors: Jared L. Elliott, Prior Lake, MN (US); Nathan D. Wenninger, Prior Lake, MN (US)

(73) Assignee: Health Postures, LLC, Prior Lake, MN (US)

( * ) Notice: Subject to any disclaimer, the term of this patent is extended or adjusted under 35 U.S.C. 154(b) by 376 days.

(21) Appl. No.: 14/517,412

(22) Filed: Oct. 17, 2014

(65) Prior Publication Data

US 2015/0108294 A1     Apr. 23, 2015

Related U.S. Application Data

(60) Provisional application No. 61/893,136, filed on Oct. 18, 2013.

(51) Int. Cl.
| | | |
|---|---|---|
| *F16M 13/02* | (2006.01) | |
| *F16M 11/04* | (2006.01) | |
| *F16B 11/00* | (2006.01) | |
| *F16B 47/00* | (2006.01) | |

(52) U.S. Cl.
CPC ........ *F16M 13/022* (2013.01); *F16M 11/046* (2013.01); *F16B 11/006* (2013.01); *F16B 47/006* (2013.01); *Y10T 29/49826* (2015.01)

(58) Field of Classification Search
CPC ... F16M 13/022; F16M 11/046; F16M 47/006
See application file for complete search history.

(56) References Cited

U.S. PATENT DOCUMENTS

| | | | | |
|---|---|---|---|---|
| 6,152,414 A | * | 11/2000 | Jondrow | G06F 1/1632 |
| | | | | 248/205.8 |
| 8,826,831 B2 | | 9/2014 | Hazzard et al. | |
| 2005/0205745 A1 | * | 9/2005 | Lee | F16M 11/046 |
| | | | | 248/371 |
| 2005/0265711 A1 | * | 12/2005 | Heibel | B60R 11/04 |
| | | | | 396/419 |
| 2008/0230662 A1 | * | 9/2008 | Takahashi | F16B 47/006 |
| | | | | 248/206.2 |
| 2011/0127395 A1 | * | 6/2011 | Ostendarp | F16B 47/006 |
| | | | | 248/205.8 |

(Continued)

FOREIGN PATENT DOCUMENTS

WO    WO 2014144136    9/2014

*Primary Examiner* — Gary C Hoge
(74) *Attorney, Agent, or Firm* — Charles A. Lemaire; Jonathan M. Rixen; Lemaire Patent Law Firm, P.L.L.C.

(57) ABSTRACT

Apparatus and method for positioning a computer workstation relative to a work surface, the apparatus including a base, wherein the base includes at least one attachment mechanism located on a bottom surface of the base, wherein the at least one attachment mechanism is configured to affix the base to the work surface; a support column that extends upward from the base; a display mount movably coupled to the support column such that the display mount is configured to move in a first range of travel relative to the base; and a keyboard tray movably coupled to the support column such that the keyboard tray is configured to move in a second range of travel relative to the base.

20 Claims, 10 Drawing Sheets

(56) References Cited

U.S. PATENT DOCUMENTS

| | | | |
|---|---|---|---|
| 2011/0235250 A1* | 9/2011 | Burgess | F16M 11/046 361/679.01 |
| 2012/0019990 A1* | 1/2012 | Segar | F16M 11/08 361/679.01 |
| 2013/0248665 A1* | 9/2013 | Koklamanis | F16M 11/22 248/206.3 |
| 2015/0014493 A1* | 1/2015 | Wu | F16M 11/046 248/125.2 |
| 2015/0070839 A1* | 3/2015 | Johnson | G06F 1/1626 361/679.56 |
| 2016/0256002 A1* | 9/2016 | Potter | A47J 45/02 |

* cited by examiner

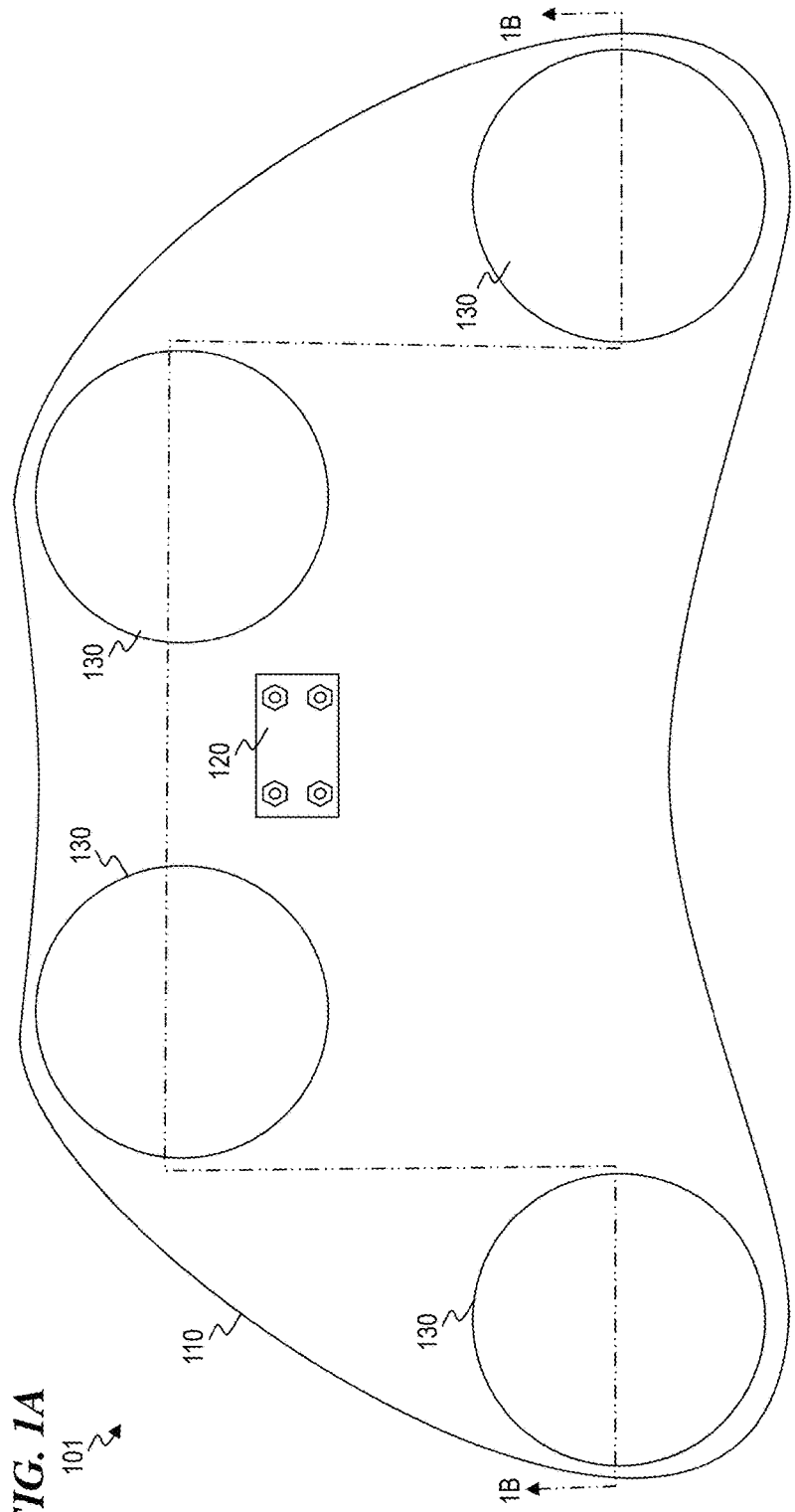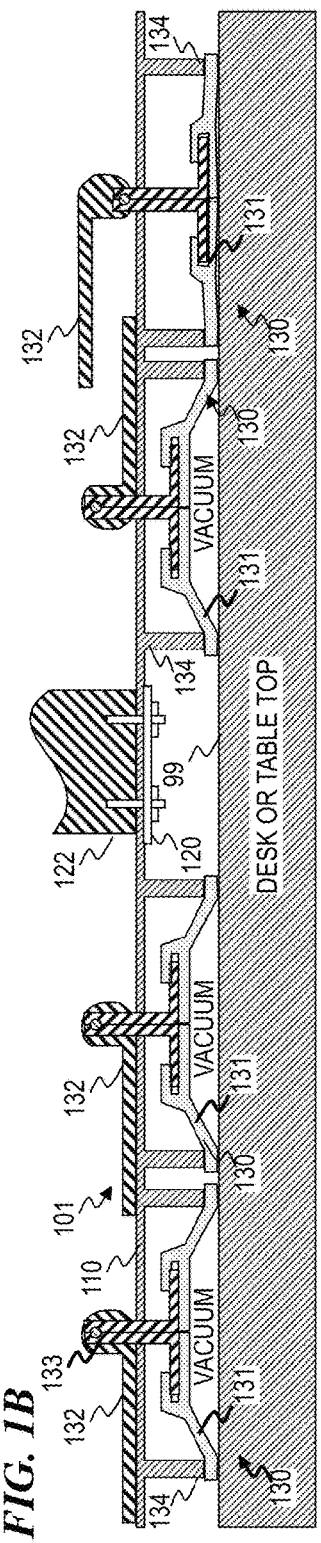

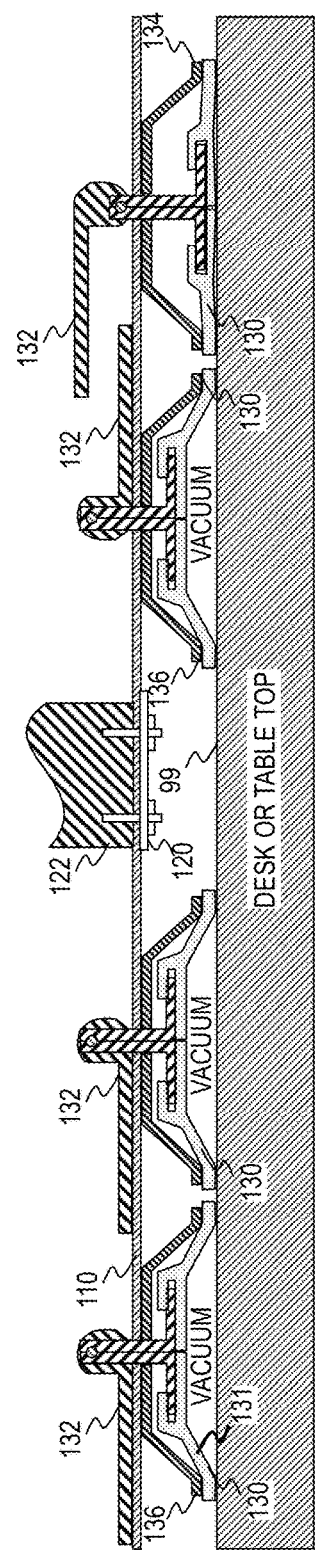

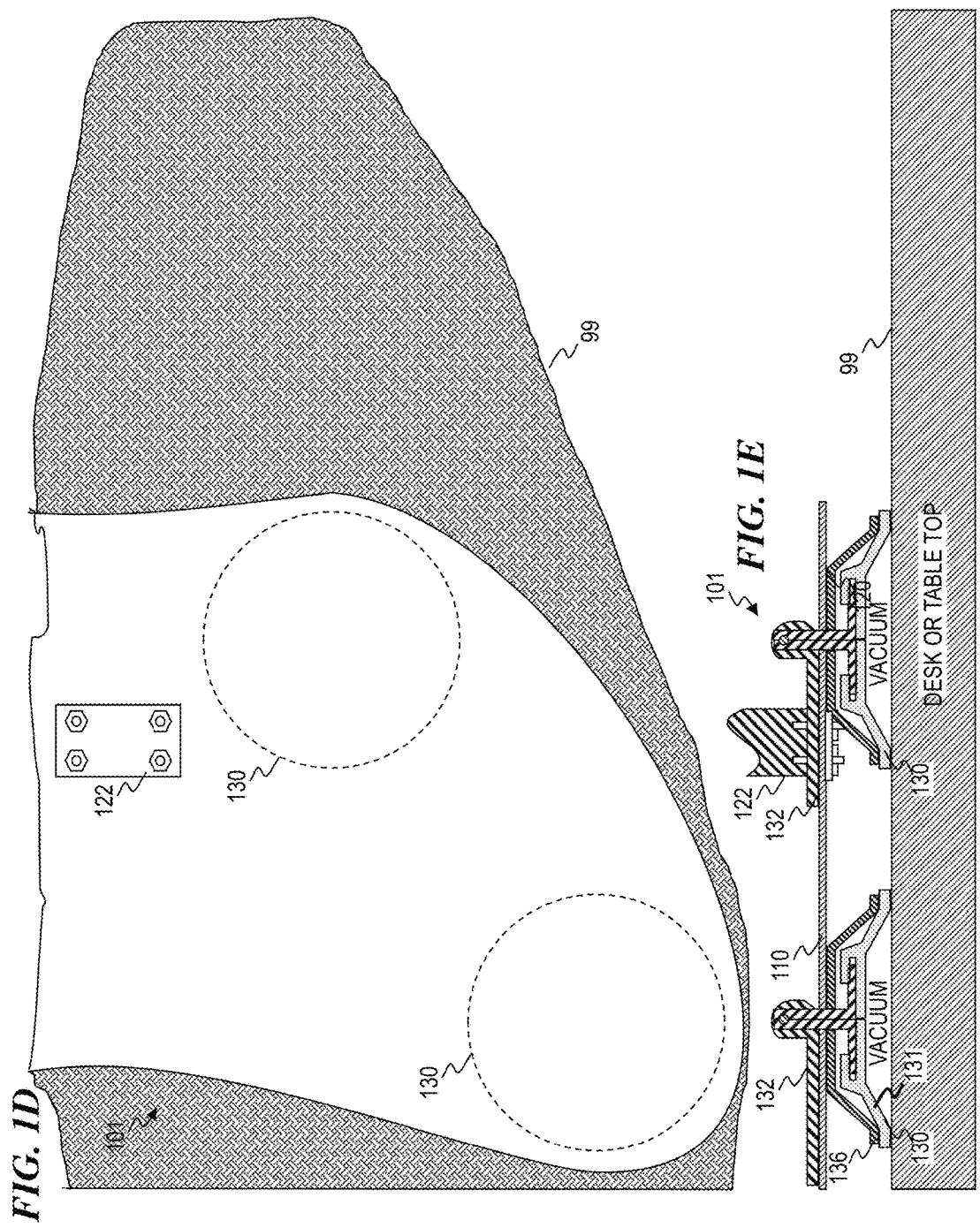

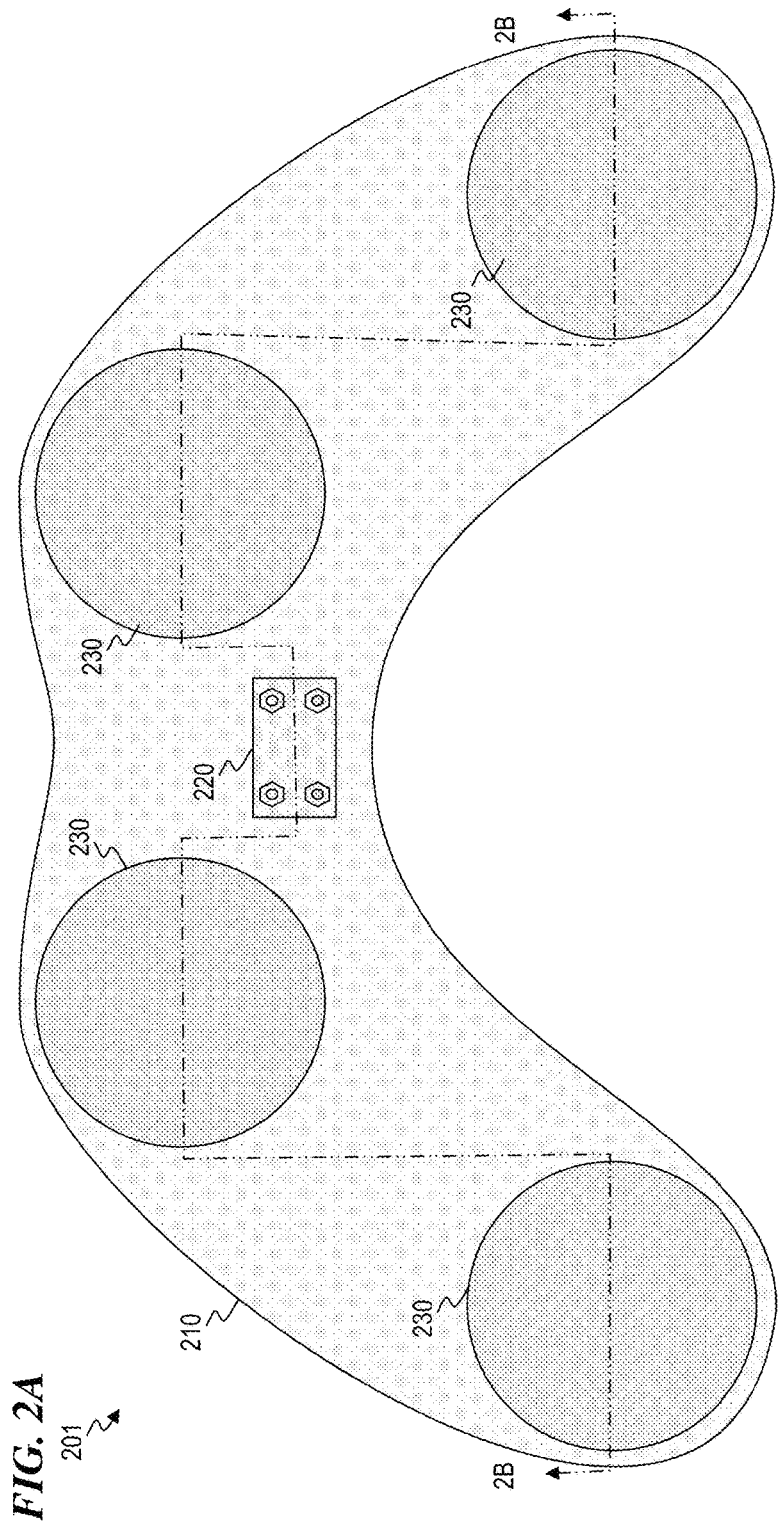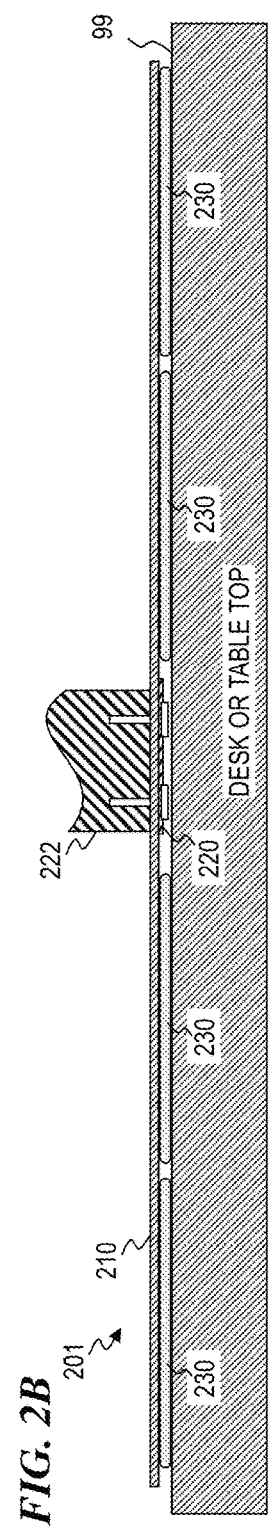
FIG. 2A
FIG. 2B

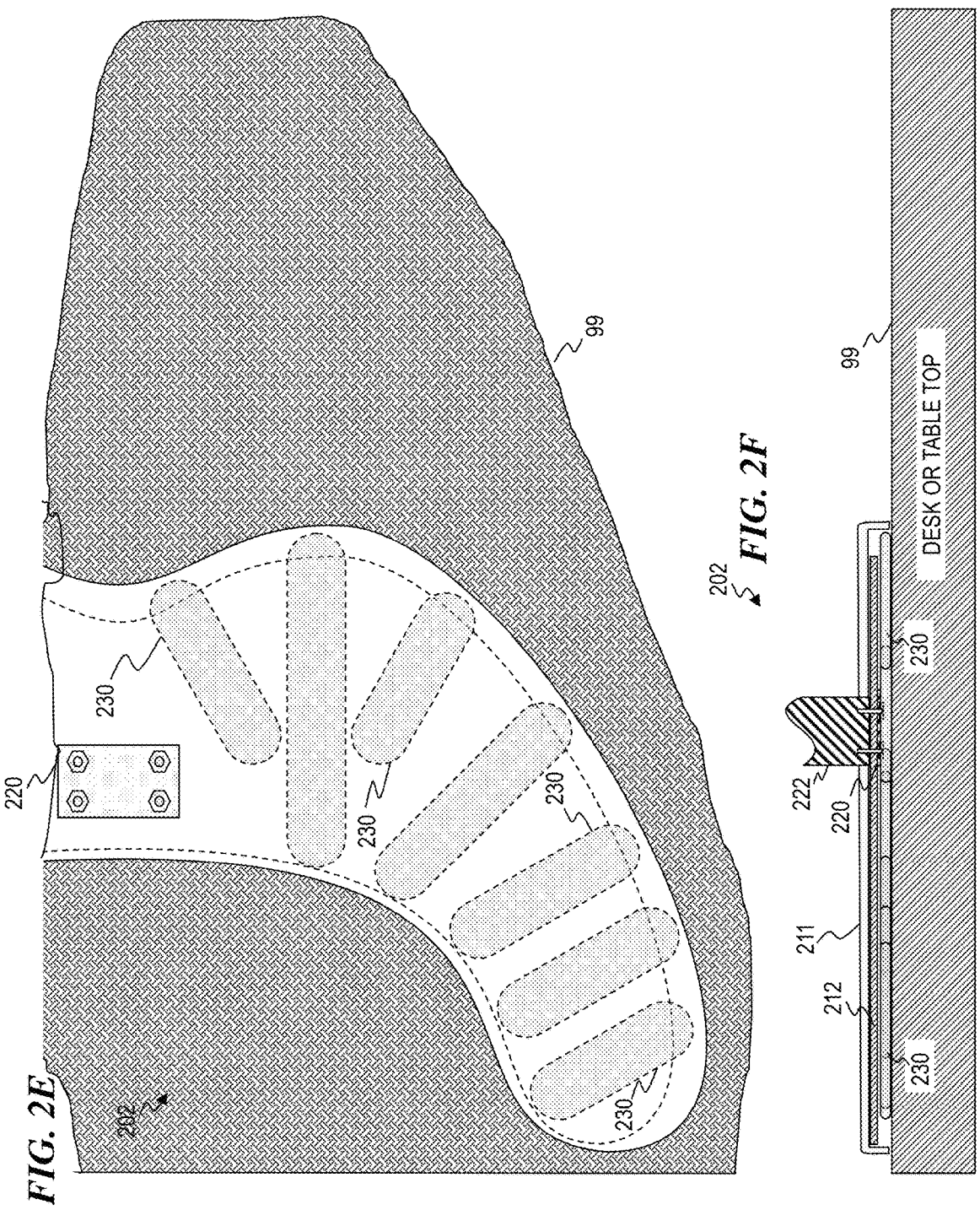

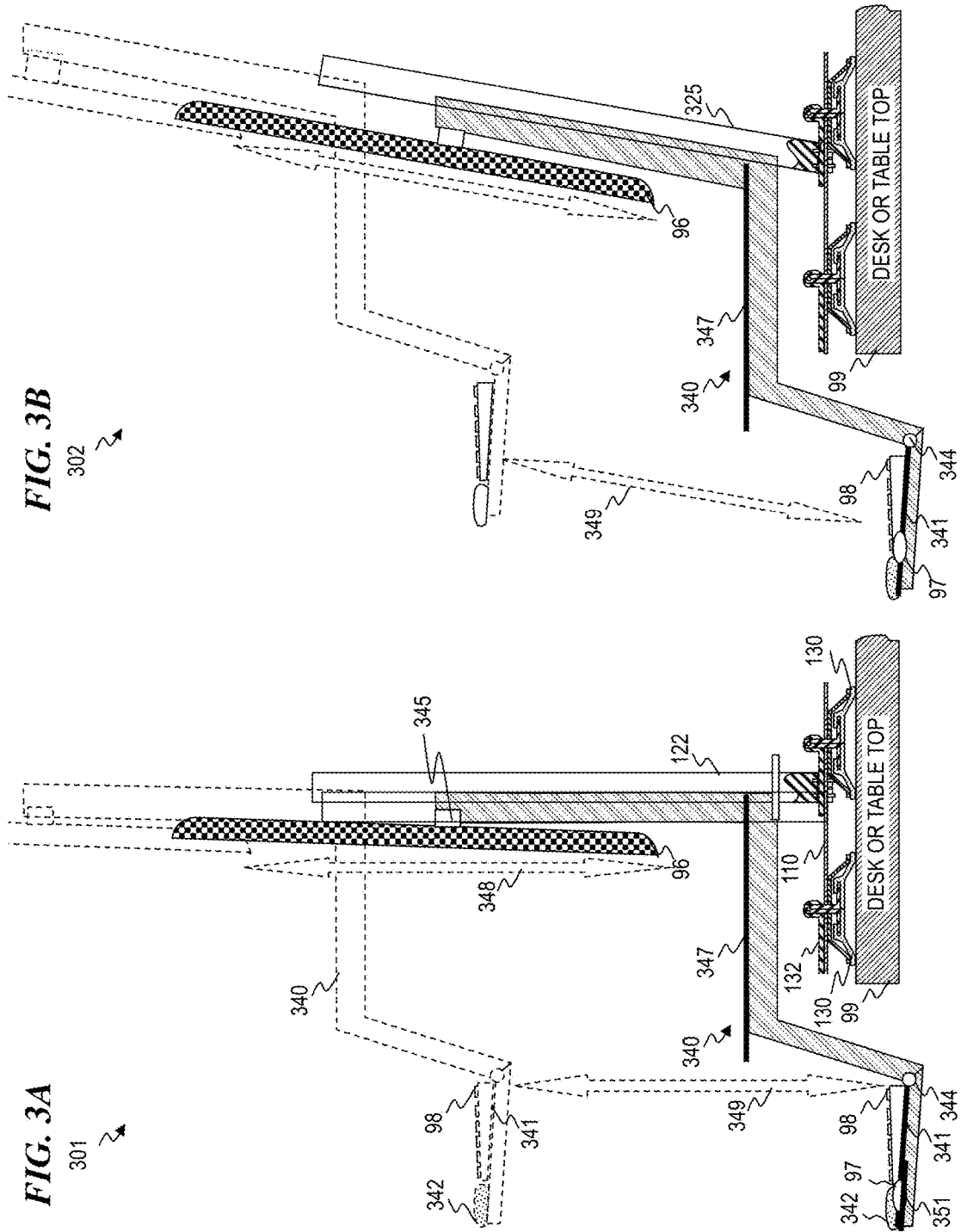

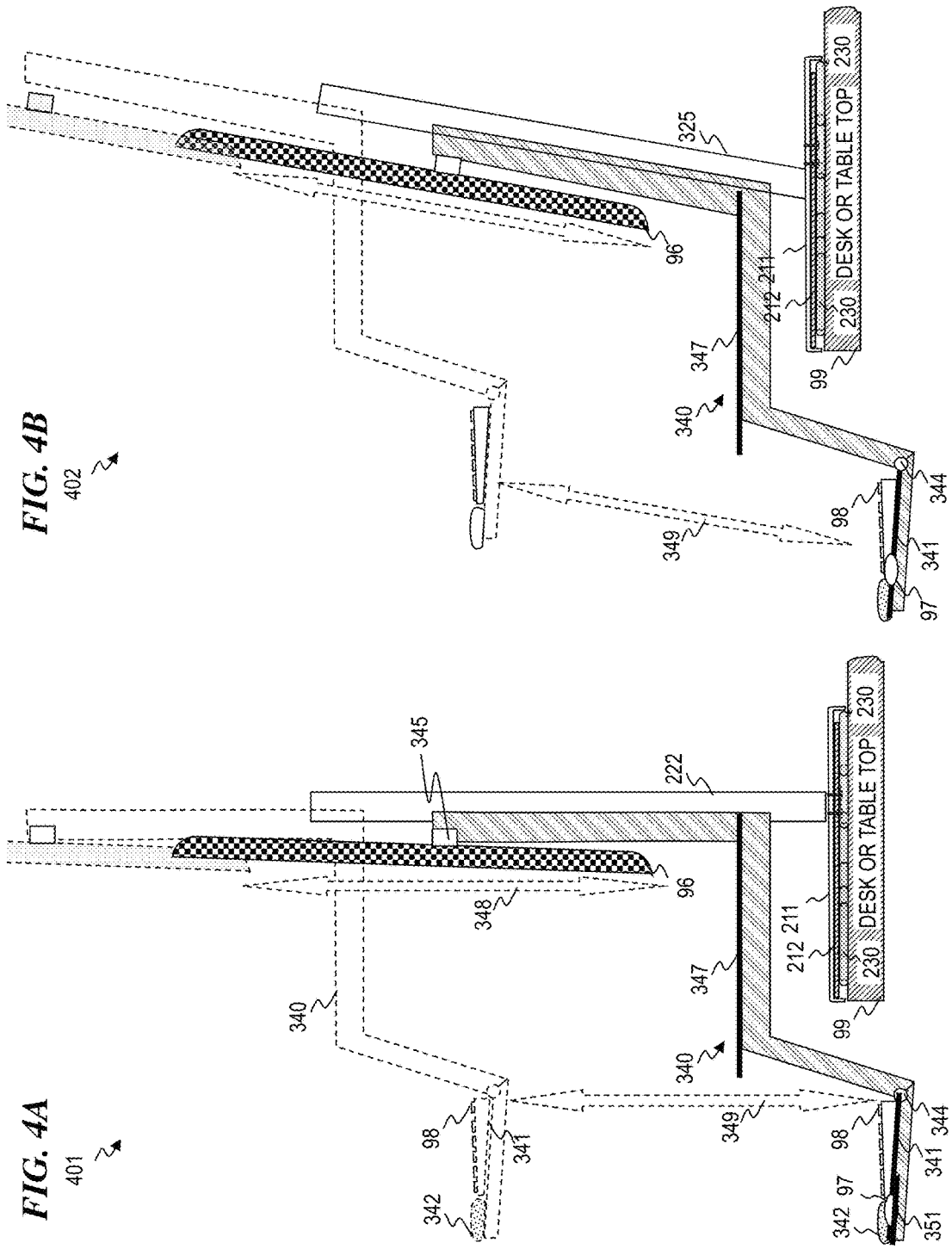

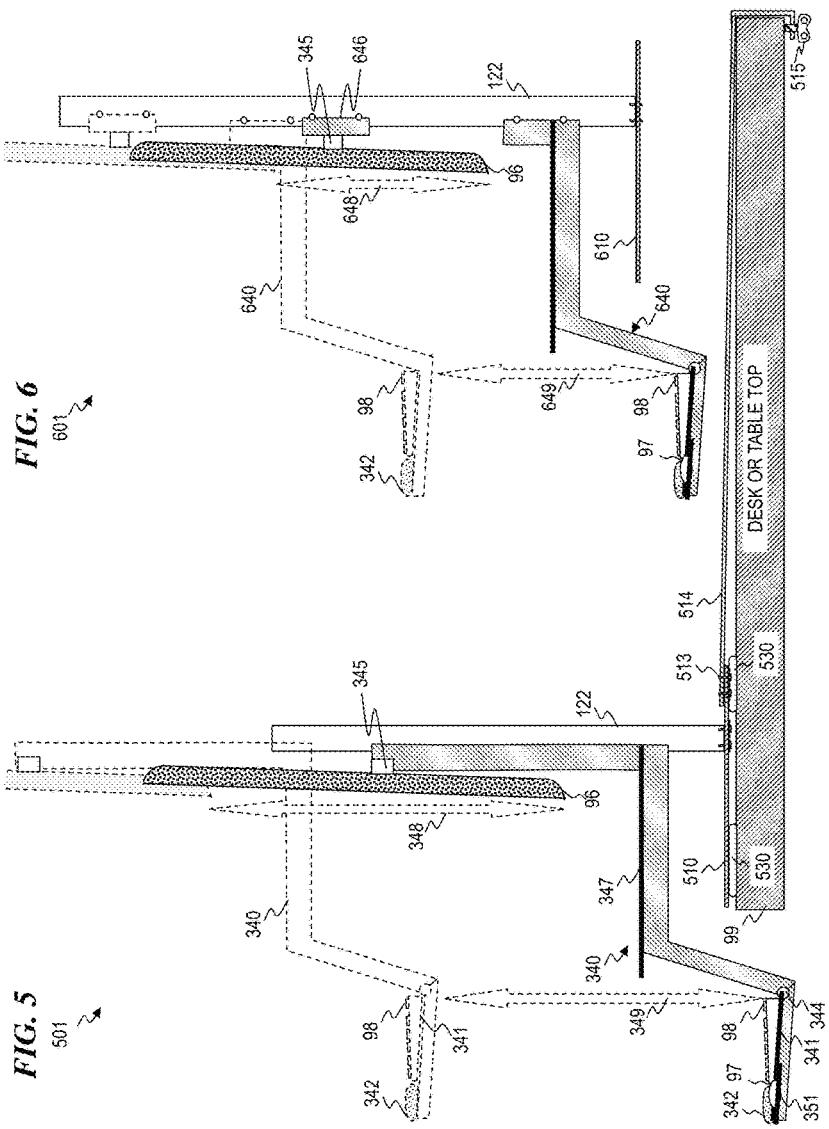

US 9,810,370 B2

DESK MOUNT FOR COMPUTER DISPLAY(S)

FIELD OF THE INVENTION

This invention relates to the field of furniture for holding computer equipment and more specifically to a method and apparatus of mounting computer display(s), keyboard, and mouse to a desktop using an up-down movable mount having attachment mechanisms on the base of the mount to hold the mount securely to a desk such that the display(s), keyboard, and mouse can be raised for use by a human user standing up, and can be lowered for use by a human user sitting down.

BACKGROUND OF THE INVENTION

Numerous conventional display-positioning systems have been attempted, but all leave much to be desired.

US Patent Publication 2012/0187056, which is hereby incorporated by reference, describes a mounting portion configured to support an electronic display and a keyboard. The mounting portion is movable with respect to the work surface between multiple positions, including for example, a sitting position and a standing position. That apparatus relies on a front edge clamp that does not allow the apparatus to be placed anywhere on the desk other than at the front edge, and it does not protect the apparatus from tipping forward if someone leans hard on the keyboard tray or puts force on the upright post in the forward or sideways directions, and it scratches or dents the top surface of the desk and is unsuitable for glass-topped desks to the requirement for a front-edge clamp.

What is needed is a display-repositioning system that securely mounts to a desk or table top and allows repositioning of the keyboard tray, mouse pad and computer display back and forth between a lowered position suitable for use by a person sitting at the desk, and a raised position suitable for use by a person standing at the desk.

SUMMARY OF THE INVENTION

The present invention provides a method and apparatus of mounting computer display(s), keyboard, and mouse to a table or desk using an up-down movable mount having attachment mechanisms on the bottom surface of the base of the mount to hold the mount securely to a desk such that the display(s), keyboard, and mouse can be raised for use by a human user standing up, and can be lowered for use by a human user sitting down.

In some embodiments, the present invention provides n apparatus for positioning a computer workstation relative to a work surface, the apparatus including a base, wherein the base includes at least one attachment mechanism located on a bottom surface of the base, wherein the at least one attachment mechanism is configured to affix the base to the work surface; a support column that extends upward from the base; a display mount movably coupled to the support column such that the display mount is configured to move in a first range of travel relative to the base; and a keyboard tray movably coupled to the support column such that the keyboard tray is configured to move in a second range of travel relative to the base.

In some embodiments, the present invention provides method for positioning a computer workstation relative to a work surface, the method including providing a workstation frame that includes: a base, wherein the base includes at least one attachment mechanism located on a bottom surface of the base, wherein the at least one attachment mechanism is configured to affix the base to the work surface; a support column that extends upward from the base, a display mount movably coupled to the support column such that the display mount is configured to move in a first range of travel relative to the base, and a keyboard tray movably coupled to the support column such that the keyboard tray is configured to move in a second range of travel relative to the base; affixing the base of the workstation frame to the work surface using the at least one attachment mechanism; and selectively positioning the display mount and the keyboard tray in a plurality of positions, wherein the plurality of positions includes a first position that places the keyboard tray below the desk surface and a second position that places the keyboard tray above the work surface.

BRIEF DESCRIPTION OF THE DRAWINGS

FIG. 1A is a bottom view of a display-positioning mount 101 that includes a mount base 110 having lever-locking suction cups 130 for securely attaching the base to a table or desk, according to one embodiment of the present invention.

FIG. 1B is a cross-section front-side view of display-positioning mount 101, according to one embodiment of the present invention.

FIG. 1C is a cross-section front-side view of display-positioning 101, according to one embodiment of the present invention.

FIG. 1D is a top view of display-positioning mount 101 affixed to a surface 99, according to one embodiment of the present invention.

FIG. 1E is a cross-section right-side view of display-positioning mount 101 affixed to surface 99, according to one embodiment of the present invention.

FIG. 2A is a bottom view of a display-positioning mount 201 that includes a mount base 210 having circular adhesive pieces 230 for securely attaching the base to a table or desk, according to one embodiment of the present invention.

FIG. 2B is a cross-section front-side view of display-positioning mount 201, according to one embodiment of the present invention.

FIG. 2E is a top view of display-positioning mount 202 affixed to a surface 99, according to one embodiment of the present invention.

FIG. 2F is a cross-section right-side view of display-positioning mount 202 affixed to surface 99, according to one embodiment of the present invention.

FIG. 3A is a cross-section right-side view of a display-positioning mount 301 having a vertical post 122 and lever-locking suction cups 130 for securely attaching mount base 110 to a table or desk 99, according to one embodiment of the present invention.

FIG. 3B is a cross-section right-side view of a display-positioning mount 302 having an angled post 125 with an oblique angle relative to the front surface of mount base 110 and lever-locking suction cups 130 for securely attaching base 110 to a table or desk 99, according to one embodiment of the present invention.

FIG. 4A is a cross-section right-side view of a display-positioning mount 401 having a vertical post 122 and one or more adhesive pieces 230 for securely attaching mount base 212 to a table or desk 99, according to one embodiment of the present invention.

FIG. 4B is a cross-section right-side view of a display-positioning mount 402 having an angled post 125 with an oblique angle relative to the front surface of mount base 212 and one or more adhesive pieces 230 for securely attaching the base to a table or desk 99, according to one embodiment of the present invention.

FIG. 5 is a cross-section right-side view of a display-positioning mount 501 that includes a vertical post 122, and pads 530 and a stability extension 514 for securely attaching the base to a table or desk 99, according to one embodiment of the present invention.

FIG. 6 is a cross-section right-side view of a display-positioning mount 601 that includes a monitor assembly 646 and a keyboard assembly 640 that move independently from each other, according to one embodiment of the present invention.

DESCRIPTION OF PREFERRED EMBODIMENTS

Figure 2C:
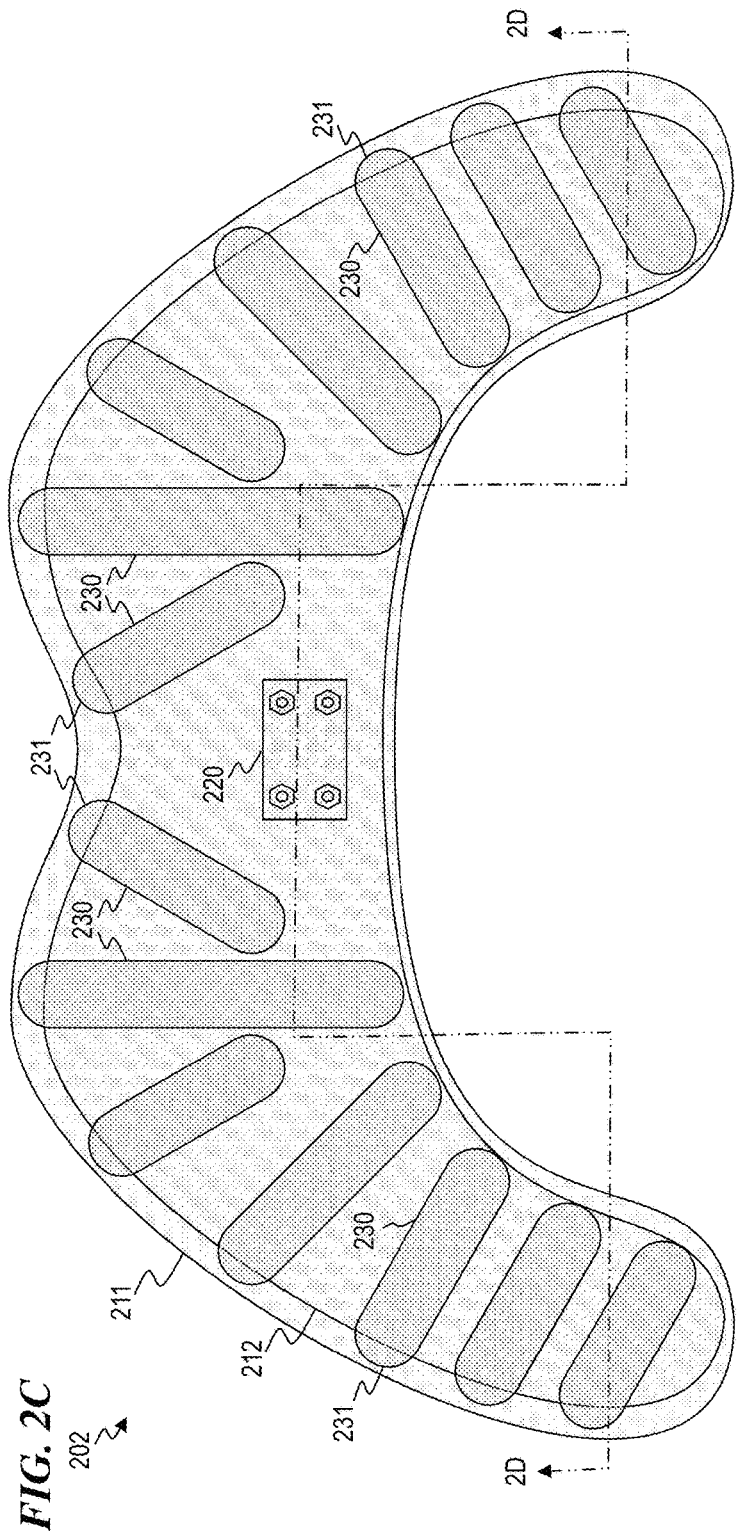
FIG. 2C is a bottom view of a display-positioning mount 202 that includes a mount base 210 having strip-shaped adhesive pieces 230, according to an embodiment of the present invention.

Although the following detailed description contains many specifics for the purpose of illustration, a person of ordinary skill in the art will appreciate that many variations and alterations to the following details are within the scope of the invention. Very narrow and specific examples are used to illustrate particular embodiments; however, the invention described in the claims is not intended to be limited to only these examples, but rather includes the full scope of the attached claims. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The embodiments shown in the Figures and described here may include features that are not included in all specific embodiments. A particular embodiment may include only a subset of all of the features described, or a particular embodiment may include all of the features described.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

FIG. 1A is a bottom view of a display-positioning mount 101 that includes a mount base 110 having lever-locking suction cups 130 for securely attaching the base to a table or desk, according to one embodiment of the present invention. The nuts and bolts for securing the post base plate 120 are shown. The plurality of lever-locking suction cups 130 are spaced apart to provide a stable support even in the unlikely case that one or more of the suction cups 130 releases its vacuum. In various embodiments, the base 110 is made of steel or aluminum, and formed by laser cutting or casting liquid metal or other suitable process, or base 110 is made of a polymer (e.g., polycarbonate, ABS or other suitable plastic) that is molded to a suitable shape, or composite polymer-wood material or any other suitable material. Cut line 1B shows the position of the cross-section view for FIG. 1B. In some embodiments, suction cups 130 are coated with a light adhesive or have a sticky surface or coating that helps prevent leaking or loss of vacuum.

FIG. 1B is a cross-section front-side view of display-positioning mount 101, according to one embodiment of the present invention. In some embodiments, each suction cup 130 includes a ring 134 that is molded to mount base 110 in a hollow cylindrical shape, a pliable membrane 131 whose perimeter is held by ring 134, a suction-cup activating post 133 that is secured at its bottom end to the pliable membrane 131 and at its top end by eccentric locking lever arm 132 on the top surface of mount base 110. The left hand three suction cups 130 are shown in the locked position with a vacuum formed between membrane 131 and the top surface of desk 99. Unlike other conventional systems (e.g., that of US Patent Publication 2012/0187056, which is incorporated herein by reference) that rely on clamps or bolts through holes in the desk, the suction-cup arrangement of the present invention allows positioning of mount 101 anywhere on the surface of the desk 99 that provides the plurality of lever-locking suction cups 130 with a smooth surface to which to apply their suction-cup vacuum. In some embodiments, suction cups with diameters of between 3 inches and 4 inches inclusive, or between 4 inches and 5 inches inclusive, or between 5 inches and 6 inches inclusive, or combinations of these ranges are used. 3 to 6 inches equal about 75 mm to 150 mm. Other embodiments use suction cups of other diameters. In some embodiments, the upright post 122 is held by bolts that run through base 110 between bottom plate 120 and post 122, and are held at the bottom by nuts. In other embodiments, post 122 is secured by welding or other means.

FIG. 1C is a cross-section front-side view of display-positioning 101, according to one embodiment of the present invention. This embodiment is substantially similar to that shown in FIG. 1B, except that the rings 134 that extend from base 110 and are an integral part of base 110 in the FIG. 1B embodiment are replaced by cups 136 that, in some embodiments, are spot welded or otherwise affixed to base 110.

FIG. 1D is a top view of display-positioning mount 101 affixed to a surface 99, according to one embodiment of the present invention.

FIG. 1E is a cross-section right-side view of display-positioning mount 101 affixed to surface 99, according to one embodiment of the present invention.

FIG. 2A is a bottom view of a display-positioning mount 201 that includes a mount base 210 having circular-shaped adhesive pieces 230 for securely attaching the base to a table or desk, according to one embodiment of the present invention. Other embodiments can use adhesive pieces 230 of any other suitable shape. In some embodiments, each adhesive piece 230 includes an adhesive substance on at least one surface of the piece 230 that is configured to bond or adhere the piece 230 to a corresponding surface (e.g., in some embodiments, the adhesive substance includes a pressure-sensitive adhesive (e.g., the adhesive commonly found on adhesive strips or used in glue dots)). In some embodiments, adhesive pieces 230 include Geckskin™, a fabric-backed adhesive system that relies on the integration of a "pad", "skin", and a "tendon", as described by PCT Application Publication WO 2014/144136, which is incorporated herein by reference and which is included as an appendix to the present specification. In some embodiments, each adhesive piece 230 is double-sided (i.e., each side includes a suitable adhesive substance) such that one side is affixed to the bottom surface of base 210 and the other side is affixed to the top surface of a table or desk. In other embodiments, each respective adhesive piece 230 has only one side with an adhesive substance configured to adhere to a table or desk while the other side of the adhesive piece 230 is attached to base 210 in any other suitable fashion (e.g., mechanically, magnetically, or the like). In some embodiments, adhesive pieces 230 are removable such that an adhesive piece 230 can be removed from a corresponding surface without leaving a residue on the corresponding surface. In other embodiments, adhesive pieces 230 are permanently bonded to a corresponding surface. In some embodiments, one side of the adhesive piece 230 is permanently bonded to a first surface while the opposite side of adhesive piece 230 is removably bonded to a second surface. In some embodiments, adhesive pieces 230 have a circular shape (as shown in FIG. 2A). In other embodiments, adhesive pieces 230 have any other suitable shape (see, e.g., the strip-shaped adhesive pieces 230 of FIGS. 2C-2F).

In some embodiments, each adhesive piece 230 is a portion of an adhesive that is added directly to the bottom surface of base 210 and/or the top surface of a desk or table (e.g., in some embodiments, each adhesive piece 230 is a dispensed glue dot, a dispensed portion of a hot adhesive (e.g., an ethylene-vinyl acetate hot melt dispensed with a hot glue gun), a dispensed reactive adhesive (e.g., an acrylic polymer-polyurethane resin combination), or the like).

FIG. 2B is a cross-section front-side view of display-positioning mount 201, according to one embodiment of the present invention.

FIG. 2C is a bottom view of a display-positioning mount 202 that includes a mount base 210 having strip-shaped adhesive pieces 230, according to an embodiment of the present invention. In some embodiments, strip-shaped adhesive pieces 230 include one or more removable double-sided adhesive strips such as Command™-brand edge-removable strips provided by 3M Company, St. Paul, Minn. 55144 (www.command.com/wps/portal/3M/en_US/NACommand/Command/?WT.mc_id=www.command.com&WT.ctod=15:00). In some such embodiments, Command™-brand edge-removable strips provide the advantage of being removable by pulling an exposed edge tab of each strip from the side without having to pry base 210 away from the table surface of table 99 and therefore a tab at the tip edge of each adhesive strip extends beyond the edge of support base 212 such that the tab can be pulled in order to remove each strip when a user wishes to move apparatus 202. In some embodiments, strip-shaped adhesive pieces 230 include one or more strips of double-sided adhesive tape such as provided by Morris Products, Inc., Queensbury, N.Y. 12804 (www.morrisproducts.com/wire-management/double-sided-adhesive-tape.asp). In some embodiments, strip-shaped adhesive pieces 230 include one or more strips of Duck® Brand carpet tape such as provided by ShurTech Brands, Avon Ohio 44011 (www.duckbrand.com/products/diy-products/carpet-tapes/heavy-traffic-carpet-tape).

In some embodiments, each strip-shaped adhesive piece 230 has a tab 231, wherein at least a portion of tab 231 extends outward from the bottom surface of base 212 such that this portion is not covered by base 212. For example, in some embodiments, where pieces 230 are Command™-brand edge-removable strips, this exposed portion of tab 231 is necessary for future easy removal of the pieces 230 and thus facilitates future removal of base 212 from desk 99. In some such embodiments, in order to hide the exposed tabs 231 of pieces 230 for aesthetic purposes, yet provide easy access to these exposed portions for future removal, a decorative extension cover 211 is provided that is removably covering base 212 and the otherwise-exposed tabs 231. In some embodiments, cover 211 is connected to base 212 by the nuts and bolts that connect base plate 220 to post 222.

Figure 2D:
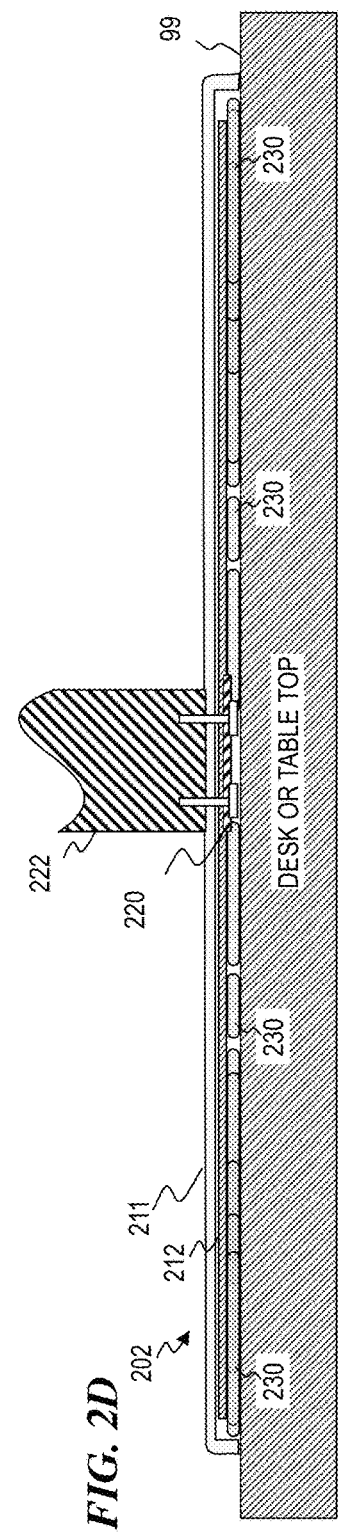
FIG. 2D is a cross-section front-side view of display-positioning mount 202, according to one embodiment of the present invention.

FIG. 2D is a cross-section front-side view of display-positioning mount 202, according to one embodiment of the present invention.

FIG. 2E is a top view of display-positioning mount 202 affixed to a surface 99, according to one embodiment of the present invention.

FIG. 2F is a cross-section right-side view of display-positioning mount 202 affixed to surface 99, according to one embodiment of the present invention.

FIG. 3A is a cross-section right-side view of a display-positioning mount 301 having a vertical post 122 and lever-locking suction cups 130 for securely attaching mount base 110 to a table or desk 99, according to one embodiment of the present invention. The range of travel of display 96 for one embodiment is shown by arrow 348, and the movable assembly 340 that includes display attachment 345, keyboard tray 341, mouse pad 351, as well as optional table surface 347 (if table surface 347 is included in the embodiment) are attached to an arm that is attached to display attachment 345, so the keyboard 98 and mouse 97 are on surfaces that move in the same direction and amount (shown by arrow 349) as display 96 moves. In some embodiments, the keyboard tray 341 folds up via hinge 344. In some embodiments, a padded wrist rest 342 is provided on keyboard tray 341. In some embodiments, the movable assembly 340 including tray 341 is positionable at any one or a plurality of different angles for user comfort while typing.

FIG. 3B is a cross-section right-side view of a display-positioning mount 302 having an angled post 325 with an oblique angle relative to the front surface of mount base 110 and lever-locking suction cups 130 for securely attaching base 110 to a table or desk 99, according to one embodiment of the present invention. In some embodiments, the embodiment of FIG. 3B is the same as that shown in FIG. 3A, except for the angle of post 325 being oblique, while the angle of post 122 in FIG. 3A is perpendicular to the top surface of desk 99.

The embodiments of both FIG. 3A and FIG. 3B provide excellent long-term stiffness and stability of the display-positioning apparatus, which withstands substantial sideways force when the levers 132 are in the locked (vacuum-holding) position (forces in excess of 250 pounds applied horizontally to the top of post 122 or 325 do not separate the suction cups 130 from the surface of desk 99, in some embodiments). Further, the lever arms 132 can be quickly and easily released to move the apparatus to alternate positions on the desk surface (but moving a fully loaded apparatus having one or more heavy displays would usually need more than one person). In addition the rubber membranes 131 do not mar the surface of most desks, even after repeated repositionings.

FIG. 4A is a cross-section right-side view of a display-positioning mount 401 having a vertical post 222 and adhesive pieces 230 for securely attaching mount base 212 to a table or desk 99, according to one embodiment of the present invention.

FIG. 4B is a cross-section right-side view of a display-positioning mount 402 having an angled post 325 with an oblique angle relative to the front surface of mount base 212 and adhesive pieces 230 for securely attaching the base to a table or desk 99, according to one embodiment of the present invention.

Mounts 401 and 402 are substantially similar to mounts 301 and 302, respectively, except that adhesive pieces 230 replace suction cups 130. Like suction cups 130, adhesive pieces 230 provide excellent long-term stiffness and stability of the display-positioning apparatus, and adhesive pieces 230 also do not damage or leave residue on the surface of most desks, even after multiple uses (especially, e.g., when using removable double-sided adhesive strips).

FIG. 5 is a cross-section right-side view of a display-positioning mount 501 that includes a vertical post 122, and pads 530 and a stability extension 514 (e.g., in some embodiments, a rod or bar) for securely attaching the base to a table or desk 99, according to one embodiment of the present invention. In some embodiments, mount 501 is substantially similar to mount 301 or 401 of FIGS. 3A and 4A, respectively, (wherein pads 530 include one or more suction cups 130 such as shown in FIG. 3A and described above, or wherein pads 530 include one or more adhesive pieces 230 such as shown in FIG. 4A and described above), except that mount 501 further includes a stability extension 514 that extends from base 510 across the work surface 99 to a rear edge of the work surface 99 where the stability extension 514 is configured to be secured to the rear edge of the work surface 99. In other embodiments, pads 530 are not adhesive or vacuum-operated attachments, but instead are omitted or provide simple cushioning or scratch prevention. In such embodiments, the width of base 510 in a direction parallel to the front edge of table top 99 extends far enough beyond the center of gravity to provide stability without the attachment of vacuum cups or adhesive pieces, due to the stability provided by stability extension 514. In some embodiments, stability extension 514 is removably connected to base 510 via nuts and bolts 513 (or other suitable fastener such as double-sided adhesive foam or the like). In other embodiments, stability extension 514 is part of a single unitary structure that includes extension 514 and base 510. In some embodiments, stability extension 514 is secured to the rear edge of the work surface 99 via clamp 515 (e.g., in some embodiments, clamp 515 includes an upper bracket (or an L-shaped extension that extends downward from the back edge of stability extension 514) and an adjustable lower bracket that can be removable coupled to the upper bracket, e.g., by a screw at the back edge). In other embodiments, stability extension 514 has a C-shaped back end that simply hooks over the back edge of table top 99. In still other embodiments, stability extension 514 is configured to be adhesively attached to the back edge (or near the back edge) of table top 99 (e.g., in some embodiments, by Command™-brand edge-removable strips). In some embodiments, stability extension 514 provides additional support to mount 501 that prevents mount 501 from falling forward onto the user and/or the ground in scenarios where one or more of the individual attachment mechanisms 530 fails. In some embodiments, pads 530 include attachment mechanisms that include suction cups 130. In some embodiments, pads 530 include attachment mechanisms that include adhesive pieces 230. In some embodiments, pads 530 include attachment mechanisms that include a combination of suction cups 130 and adhesive pieces 230, or adhesive-coated suction cups 130.

FIG. 6 is a cross-section right-side view of a display-positioning mount 601 that includes a monitor assembly 646 and a keyboard assembly 640 that move independently from each other. In some embodiments, monitory assembly 646 (which includes display attachment 345) moves in a range of travel shown by arrow 648, while keyboard assembly 640 (which includes keyboard tray 341, mouse pad 351, and optional table surface 347) moves in a range of travel shown by arrow 649 that is independent of (and thus, in some embodiments, can be different than (e.g., larger or smaller)) the range of travel of monitor assembly 646. In some embodiments, monitor assembly 646 and keyboard assembly 640 each have a respective locking mechanism that allows the two assemblies to be locked in place independently from each other.

Figure 7A:
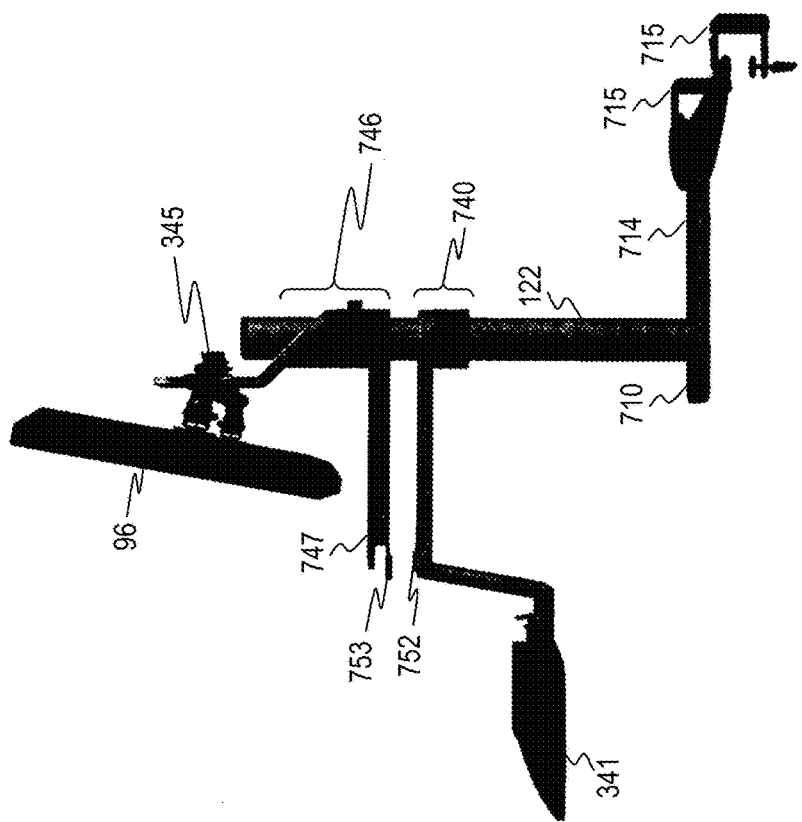
FIG. 7A is a perspective view of a display-positioning mount 701 that includes a monitor-assembly car 746 and a keyboard-assembly car 740 that move independently from each other, according to one embodiment of the present invention.

FIG. 7A is a perspective view of a display-positioning mount 701 that includes a monitor-assembly car 746 and a keyboard-assembly car 740 that move independently from each other, according to one embodiment of the present invention. In some embodiments, monitor-assembly car 746 is operatively coupled to display attachment 345 and table 747 such that movement of car 746 along post 122 moves displays 96 and table 747. In some embodiments, keyboard-assembly car 740 is operatively coupled to keyboard tray 341 such that movement of keyboard-assembly car 740 along post 122 moves keyboard tray 341. In some embodiments, monitor-assembly car 746 includes a locking lever 753 and keyboard-assembly car 740 includes a locking lever 752 that control the movement and positioning of cars 746 and 740, respectively (e.g., in some embodiments, levers 752 and 753 are spring-loaded such that lifting up on levers 752 and 753 releases a locking mechanism that normally holds the respective car in place on post 122 such that the respective car can be moved along post 122, and, in some such embodiments, letting go of levers 752 and 753 causes the locking mechanism to re-engage and lock the respective car into position on post 122).

Figure 7B:
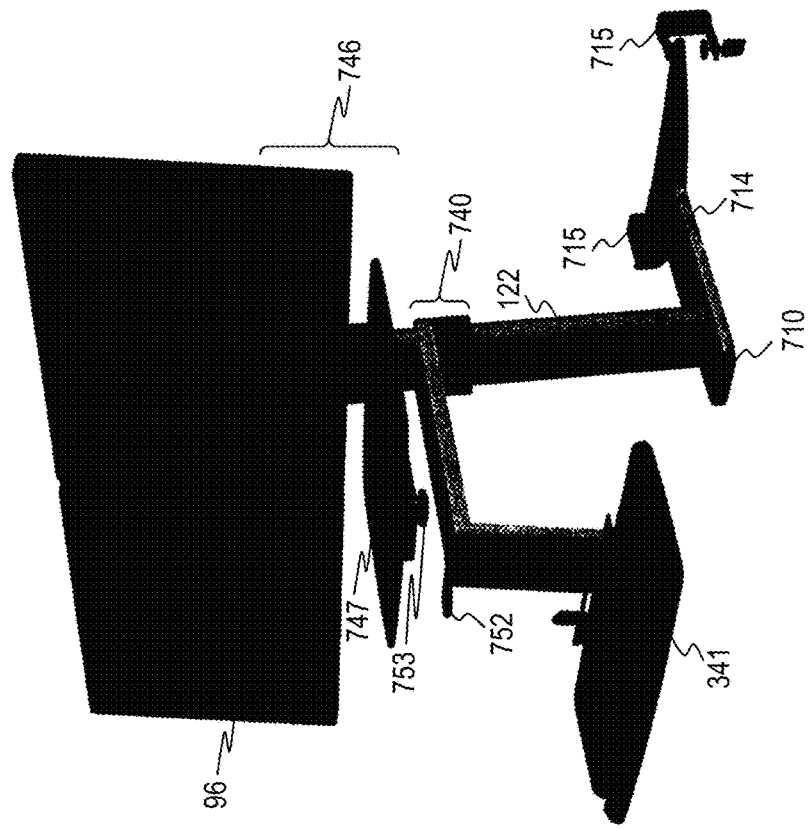
FIG. 7B is a right-side view of display-positioning mount 701, according to one embodiment of the present invention.

FIG. 7B is a right-side view of display-positioning mount 701, according to one embodiment of the present invention. In some embodiments, mount 701 includes a stability extension 714 that extends from base 710 across the work surface to a rear edge of the work surface where the stability extension 714 is configured to be secured to the rear edge of the work surface. In some embodiments, stability extension 714 is secured to the rear edge of the work surface via clamps 715, which are tightened from underneath extension 714. In other embodiments, clamps 715 are tightened from above extension 714.

In some embodiments, the present invention provides an apparatus for positioning a computer workstation relative to a work surface, the apparatus including a base, wherein the base includes at least one attachment mechanism located on a bottom surface of the base, wherein the at least one attachment mechanism is configured to affix the base to the work surface; a support column that extends upward from the base; a display mount movably coupled to the support column such that the display mount is configured to move in a first range of travel relative to the base; and a keyboard tray movably coupled to the support column such that the keyboard tray is configured to move in a second range of travel relative to the base.

In some embodiments of the apparatus, the at least one attachment mechanism includes a plurality of suction cups (see, e.g., suction cups 130 of display-positioning mount 100 in FIGS. 1A-1E). In some embodiments, the at least one attachment mechanism includes a plurality of suction cups, wherein the base includes a front portion and a rear portion, wherein the front portion is closer to the keyboard tray than the rear portion, and wherein the plurality of suction cups includes a first suction cup on the front portion of the base and a second suction cup on the rear portion of the base. In some embodiments, the at least one attachment mechanism includes at least one suction cup having a diameter of 75 millimeters. In some embodiments, the at least one attachment mechanism includes at least one suction cup, wherein the at least one suction cup includes a lever configured to lock the at least one suction cup to the work surface in a first vacuum position and to release the at least one suction cup from the work surface in a second non-vacuum position. In some embodiments, the at least one attachment mechanism includes four suction cups. In some embodiments, the at least one attachment mechanism includes four suction cups, and wherein each respective one of the four suction cups includes a lever configured to lock the respective suction cup to the work surface in a first vacuum position and to release the respective suction cup from the work surface in a second non-vacuum position.

In some embodiments, the at least one attachment mechanism includes one or more adhesive pieces. In some embodiments, the one or more adhesive pieces are removable. In some embodiments, the one or more adhesive pieces are non-removable. In some embodiments, the one or more adhesive pieces are double-sided. In some embodiments, the at least one attachment mechanism includes one or more removable adhesive pieces and one or more non-removable adhesive pieces. In some embodiments, the one or more adhesive pieces includes a plurality of adhesive strips (see, e.g., strip-shaped adhesive pieces 230 of display-positioning mount 202 in FIGS. 2C-2F). In some embodiments, the one or more adhesive pieces includes a plurality of circular adhesive pieces (see, e.g., circular adhesive pieces 230 of display-positioning mount 201 in FIGS. 2A-2B). In some embodiments, the at least one attachment mechanism includes a plurality of removable adhesive strips, wherein a portion of each one of the respective plurality of removable adhesive strips extends out from underneath the base, and wherein the base includes an extension cover that attaches to the base and is configured to cover the portion of each respective removable adhesive strip that extends out from underneath the base (see, e.g., extension cover 211 of display-positioning mount 202 in FIGS. 2C-2F).

In some embodiments of the apparatus, the display mount is configured to move in the first range of travel independently from keyboard-tray movement in the second range of travel (see, e.g., FIG. 6). In some embodiments, the second range of travel of includes a first position that places the keyboard tray below the work surface and a second position that places the keyboard tray above the work surface. In some embodiments, the display mount is configured to support a plurality of displays. In some embodiments, the keyboard tray includes a mouse holder. In some embodiments, the keyboard tray forms part of a keyboard mount that further includes a table surface. In some embodiments, the keyboard tray is configured to be positioned in a plurality of different angles relative to a position horizontal with the work surface. In some embodiments, the support column extends from the base at an angle of 90 degrees.

In some embodiments, the apparatus further includes a stability rod that extends from the base across the work surface to a rear edge of the work surface, wherein the stability rod is configured to attach to the rear edge of the work surface (e.g., see, stability rod 514 of mount 501 in FIG. 5). In some embodiments, the apparatus further includes a stability rod that extends from the base across the work surface to a rear edge of the work surface, wherein the stability rod includes a clamp that attaches to the rear edge of the work surface.

In some embodiments, the present invention provides an apparatus for positioning a computer workstation relative to a work surface, the apparatus including a base; a support column that extends upward from the base at an angle that is perpendicular with the base; a stability rod that extends from the base across the work surface to a rear edge of the work surface, wherein the stability rod is configured to attach to the rear edge of the work surface; a display mount movably coupled to the support column such that the display mount is configured to move in a first range of travel relative to the base; and a keyboard tray movably coupled to the support column such that the keyboard tray is configured to move in a second range of travel relative to the base.

In some embodiments of the apparatus, the display mount is configured to move in the first range of travel independently from keyboard-tray movement in the second range of travel. In some embodiments, the second range of travel of includes a first position that places the keyboard tray below the work surface and a second position that places the keyboard tray above the work surface. In some embodiments, the stability rod includes a clamp that attaches to the rear edge of the work surface. In some embodiments, the stability rod includes a clamp that attaches to the rear edge of the work surface, and wherein the clamp includes an upper bracket and an adjustable lower bracket coupled to the upper bracket. In some embodiments, the stability rod includes a clamp that attaches to the rear edge of the work surface, and wherein the clamp comprises a wedge.

In some embodiments, the present invention provides a method for positioning a computer workstation relative to a work surface, the method including providing a workstation frame that includes a base, wherein the base includes at least one attachment mechanism located on a bottom surface of the base, wherein the at least one attachment mechanism is configured to affix the base to the work surface; a support column that extends upward from the base, a display mount movably coupled to the support column such that the display mount is configured to move in a first range of travel relative to the base, and a keyboard tray movably coupled to the support column such that the keyboard tray is configured to move in a second range of travel relative to the base; affixing the base of the workstation frame to the work surface using the at least one attachment mechanism; and selectively positioning the display mount and the keyboard tray in a plurality of positions, wherein the plurality of positions includes a first position that places the keyboard tray below the desk surface and a second position that places the keyboard tray above the work surface.

In some embodiments of the method, the selectively positioning includes moving the display mount in the first range of travel independently from moving the keyboard tray in the second range of travel. In some embodiments, the method further includes mounting at least a first display to the display mount. In some embodiments, the workstation frame further includes a stability rod that extends from the base across the work surface to a rear edge of the work surface, the method further comprising attaching the stability rod to the read edge of the work surface.

In some embodiments of the method, the at least one attachment mechanism includes one or more adhesive pieces. In some embodiments, the at least one attachment mechanism includes a plurality of removable adhesive strips. In some embodiments, the at least one attachment mechanism includes at least one suction cup having a locking lever, and wherein the affixing of the base to the work surface includes locking the at least one suction cup to the work surface in a first vacuum position using the locking lever.

Some embodiments of the invention use a method that includes affixing a mount base to a desk surface using a plurality of suction cups having locking levers that establish a vacuum, and repositioning a display to a first position with the display lowered for a seated user and the keyboard below the desk surface, and alternatively to a position with the display raised and the keyboard positioned above the desk surface for a standing user.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first, " "second," and "third," etc., are used merely as labels, and are not intended to impose numerical requirements on their objects.

What is claimed is:

1. An apparatus for positioning a computer workstation relative to a work surface, the apparatus comprising:
    a base, wherein the base includes at least one attachment mechanism located on a bottom surface of the base, wherein the at least one attachment mechanism is configured to affix the base to the work surface;
    a support column that extends upward from the base;
    a display mount movably coupled to the support column such that the display mount is configured to move in a first range of travel relative to the base; and
    a keyboard tray movably coupled to the support column such that the keyboard tray is configured to move in a second range of travel relative to the base, wherein the display mount is configured to move in the first range of travel independently from keyboard-tray movement in the second range of travel such that the keyboard tray is configured to move in the second range of travel relative to the base without moving the display mount relative to the base.

2. The apparatus of claim 1, wherein the at least one attachment mechanism includes one or more adhesive pieces.

3. The apparatus of claim 1, wherein the at least one attachment mechanism includes a plurality of removable adhesive strips.

4. The apparatus of claim 1, wherein the at least one attachment mechanism includes a plurality of removable adhesive strips, wherein a portion of each one of the respective plurality of removable adhesive strips extends out from underneath the base, and wherein the base includes an extension cover that attaches to the base and is configured to cover the portion of each respective removable adhesive strip that extends out from underneath the base.

5. The apparatus of claim 1, further comprising a stability extension that extends from the base across the work surface to a rear edge of the work surface, wherein the stability extension is configured to hold to the rear edge of the work surface, and wherein the stability extension includes a clamp that attaches to the rear edge of the work surface.

6. The apparatus of claim 1, further comprising a stability extension that extends from the base across the work surface to a rear edge of the work surface, wherein the stability extension is configured to hold to the rear edge of the work surface, wherein the stability extension includes a clamp that attaches to the rear edge of the work surface, and wherein the clamp comprises a wedge.

7. The apparatus of claim 1, wherein the keyboard tray forms part of a keyboard mount that further includes a table surface.

8. The apparatus of claim 1, wherein the support column extends from the base at an angle of 90 degrees.

9. The apparatus of claim 1, wherein the at least one attachment mechanism includes a plurality of suction cups.

10. The apparatus of claim 1, wherein the at least one attachment mechanism includes at least one suction cup, wherein the at least one suction cup includes a lever configured to lock the at least one suction cup to the work surface in a first vacuum position and to release the at least one suction cup from the work surface in a second non-vacuum position.

11. The apparatus of claim 1, wherein the second range of travel of the keyboard tray includes a first position that places the keyboard tray below the work surface and a second position that places the keyboard tray above the work surface.

12. A method for positioning a computer workstation relative to a work surface, the method comprising:
    providing a workstation frame that includes:
        a base, wherein the base has a perimeter edge, wherein the base includes a plurality of suction cups located on a bottom surface of the base between a top side of the work surface and the bottom surface of the base, wherein the plurality of suction cups is configured to affix the base to the work surface, wherein the perimeter edge of the base extends laterally to completely cover the plurality of suction cups;
        a support column that extends upward from the base,
        a display mount movably coupled to the support column such that the display mount is configured to move in a first range of travel relative to the base, and
        a keyboard tray movably coupled to the support column such that the keyboard tray is configured to move in a second range of travel relative to the base;
    affixing the base of the workstation frame to the top side of the work surface using the plurality of suction cups; and
    selectively positioning the display mount and the keyboard tray in a plurality of positions, wherein the selectively positioning includes moving the keyboard tray in the second range of travel relative to the base without moving the display mount relative to the base.

13. The method of claim 12, wherein the workstation frame further includes a stability rod that extends from the base across the work surface to a rear edge of the work surface, the method further comprising attaching the stability rod to the read edge of the work surface.

14. The method of claim 12, wherein the plurality of suction cups includes at least one suction cup having a locking lever, and wherein the affixing of the base to the work surface includes locking the at least one suction cup to the work surface in a first vacuum position using the locking lever.

15. The method of claim 12, wherein the keyboard tray forms part of a keyboard mount that further includes a table surface.

16. The method of claim 12, wherein the support column extends from the base at an angle of 90 degrees.

17. The method of claim 12, wherein the workstation frame further includes a stability rod that extends from the base across the work surface to a rear edge of the work surface, wherein the stability rod includes a clamp, the method further comprising attaching the clamp to the read edge of the work surface.

18. The method of claim 12, wherein the plurality of suction cups includes at least one suction cup having a locking lever, wherein the locking lever is located on a top surface of the base, and wherein the affixing of the base to the work surface includes locking the at least one suction cup to the work surface in a first vacuum position using the locking lever.

19. The method of claim 12, wherein the plurality of positions includes a first position that places the keyboard tray below the work surface and a second position that places the keyboard tray above the work surface.

20. The method of claim 12, wherein the selectively positioning includes locking the display mount and the keyboard tray in place independently from each other.

* * * * *